United States Patent [19]

Rotter

[11] Patent Number: 4,465,248

[45] Date of Patent: Aug. 14, 1984

[54] TAPE DRIVE MECHANISM

[75] Inventor: Gerhard Rotter, Mission Viejo, Calif.

[73] Assignee: Rosso Corporation, Irvine, Calif.

[21] Appl. No.: 327,769

[22] Filed: Dec. 7, 1981

[51] Int. Cl.³ .................... G11B 15/26; G11B 15/43; G11B 15/66; B65H 23/08
[52] U.S. Cl. .................................... 242/192; 226/91; 242/75.41; 360/90
[58] Field of Search ............ 242/192, 195, 68.7, 242/197, 180, 179, 67.5, 75.4, 75.41; 226/91; 312/8; D14/2, 8, 9; 360/69, 90, 93, 95

[56] References Cited

U.S. PATENT DOCUMENTS

| | | | |
|---|---|---|---|
| 3,125,311 | 3/1964 | Willis | 242/192 |
| 3,580,525 | 5/1971 | Dopner | 242/189 |
| 3,698,658 | 10/1972 | Skei | 242/192 |
| 4,054,923 | 10/1977 | Lewis | 242/192 X |
| 4,072,279 | 2/1978 | Lewis | 242/192 |

FOREIGN PATENT DOCUMENTS

| | | | |
|---|---|---|---|
| 52-50206 | 4/1977 | Japan | 242/192 |
| 310295 | 9/1971 | U.S.S.R. | 242/192 |

Primary Examiner—Stuart S. Levy
Assistant Examiner—Scott J. Haugland
Attorney, Agent, or Firm—Fulwider, Patton, Riber, Lee & Utecht

[57] ABSTRACT

A tape transport of the belt driven type, wherein an endless belt engages a drive pulley and peripheral portions of tape packs on a supply reel and a take-up reel. The transport is mounted on a support frame, which is in turn mounted for sliding movement in a housing. A drive belt roller is mechanically coupled to movement of the support frame, and withdrawal of the support frame from the housing results in movement of the drive belt roller and disengagement of the belt from the supply tape pack, to facilitate tape loading and unloading. Drive belt pick-off posts affixed to the housing retain a portion of the drive belt in the housing, to maintain belt tension during tape loading and unloading, and to ensure disengagement from the supply tape pack.

26 Claims, 9 Drawing Figures

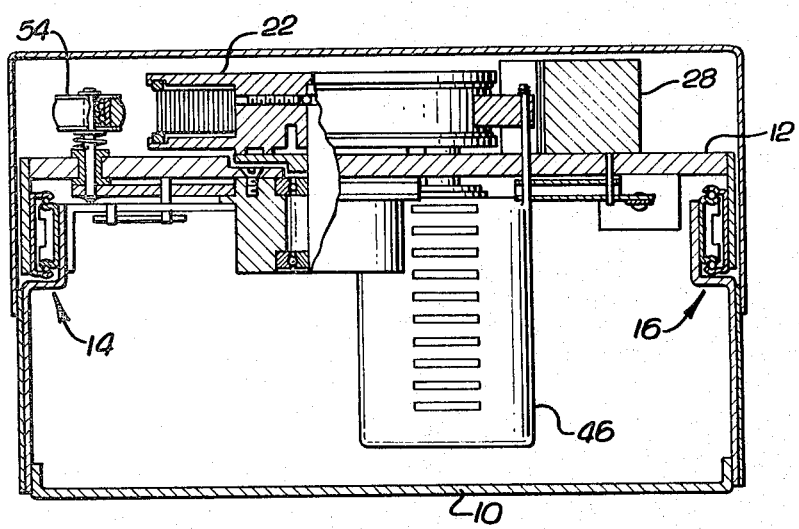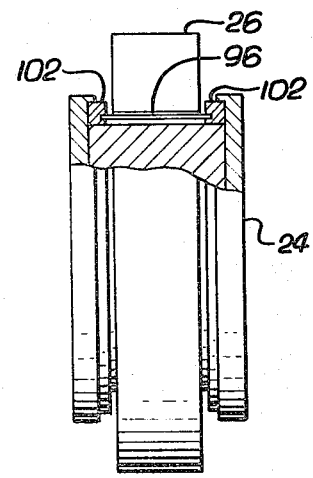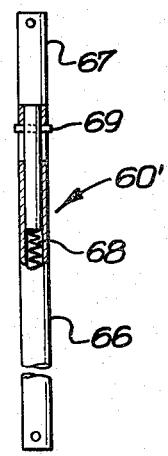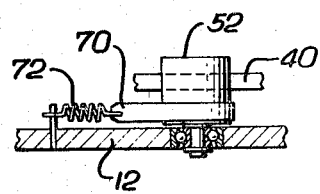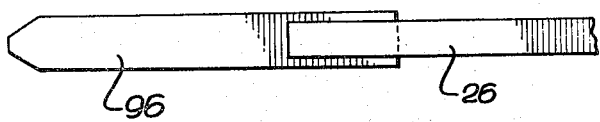

TAPE DRIVE MECHANISM

BACKGROUND OF THE INVENTION

This invention relates generally to magnetic tape drive mechanisms, and, more particularly, to tape drive mechanisms wherein tape is driven from a supply reel to a take-up reel by an endless drive belt engaging the wound tape packs on both tape reels. Tape drive mechanisms of this general type are well known in the art and provide a relatively inexpensive and reliable tape drive device, particularly for use in the recording of digital data.

An underlying problem in such belt driven tape drive mechanisms is to provide some means for loading and unloading tapes. Since the drive belt engages the periphery of both tape packs, removal of the supply reel is no simple matter. U.S. Pat. No. 3,692,255 issued in the name of Von Behren, addresses this problem by enclosing a complete drive mechanism with supply and tack-up reels in one removable cartridge. This solution renders the cartridges extremely costly or encompasses substantial performance limitations if cost is a consideration. U.S. Pat. Nos. 4,054,923 and 4,072,279 issued in the name of Lewis, disclose a single-reel cartridge for use in a belt-driven tape transport. However, the Lewis cartridge loading mechanism is relatively complex, requiring that the supply reel be held by peripheral rollers after insertion in the mechanism. Moreover, the loading mechanism is in continuous engagement after a tape supply reel has been loaded, and it appears that this would compromise the overall performance of the tape transport.

It will be apparent from the foregoing that there is still a significant need for a belt-driven tape transport having simple and reliable means for loading a tape supply reel, and that preferably the loading means be completely disengaged during normal operation. The present invention satisfies this need.

SUMMARY OF THE INVENTION

The present invention resides in a belt-driven tape transport in which the drive belt is automatically disengaged from the tape supply reel for loading and unloading. Briefly, and in general terms, the tape transport of the invention comprises a fixed housing, a tape transport support frame mounted for sliding movement with respect to the housing, means for mounting a supply tape reel and a take-up tape reel on the frame, a drive motor and drive pulley, an endless drive belt engageable with the drive pulley and with both tape packs on the supply and take-up reels, and means for automatically disengaging the drive belt from the supply tape pack when the tape transport support frame is moved out from its housing.

More specifically, the tape transport support frame is mounted in the housing in the manner of a drawer. When the support frame is slid to a closed position with respect to the housing, the drive belt is fully engaged with both tape packs and operates in a normal manner. When the tape transport support frame is moved out from the housing, the drive belt is disengaged from the supply reel tape pack, and the supply reel may be easily removed, and a new supply reel loaded into the tape transport.

In a presently preferred embodiment of the invention, the drive belt passes around at least one roller that moves with respect to the supply reel as the tape transport support frame is moved with respect to the housing. When the support frame is moved out from the housing, the movable roller pivots about the supply reel axis and disengages the drive belt from the supply reel tape pack. At the same time, a drive belt pick-up post, attached to the housing, retains at least a portion of the drive belt in the housing and takes up slack in the drive belt as the support frame is moved outwardly with respect to the housing.

In the preferred embodiment, the movable roller is mounted on a pivot plate mounted for rotation about the axis of the supply reel, and an actuator bar is pivotally connected both to the plate and to a portion of the housing. As the support frame is moved outwardly from the housing, the actuator bar rotates the pivot plate and thereby moves the movable roller around the supply reel. The drive pulley is located between the supply reel and take-up reel, and the path of the drive belt extends around the drive pulley, around the take-up tape pack, then around two additional pulleys fixed to the support frame, around the movable roller, and finally around the supply tape pack and back to the drive pulley. The drive belt pick-up post is disposed between the two additional fixed rollers when the tape drive is in an operative position. When the support frame is moved out from the housing, the drive belt pick-up post engages the drive belt between the two fixed rollers, and retains a portion of the drive belt in the housing as the movable roller is rotated to disengage the drive belt from the supply reel.

To maintain a desired tension in the recording tape, a braking torque is applied to one or more of the rollers or to the tape reels. In the preferred embodiment of the invention, braking torque is applied to only one of the drive belt rollers, while the other rollers and the tape reels are mounted on practically frictionless bearings. The use of only one braking device allows for more convenient control and adjustment of the tape tension. Alternatively, the two tape reels can be tensioned by differential braking torques.

The tape transport of the invention may also include means for automatically threading the tape from the supply reel to the take-up reel. This threading means includes means for picking a tape leader from the supply reel, guide means for guiding the tape leader, and with it the tape, past a tape recording head and towards the take-up reel, and means for automatically engaging the leader with the take-up reel and initiating winding of the tape onto the take-up reel.

It will be appreciated from the foregoing that the present invention represents a significant advance in the field of belt-driven tape transports. In particular, the invention provides a novel technique for automatically disengaging the drive belt from the take-up reel to facilitate loading and unloading of tape. Other aspects and advantages of the invention will become apparent from the following more detailed description, taken in conjunction with the accompanying drawings.

BRIEF DESCRIPTION OF THE DRAWINGS

FIG. 5 is a cross-sectional view of the tape transport taken substantially along the line 5—5 in FIG. 1;

FIG. 6 is an enlarged cross-sectional view taken substantially along the line 6—6 of FIG. 1;

FIG. 7 is an elevational view, partly in section, of the tape take-up reel of the invention;

FIG. 8 is simplified plan view of an end portion of the recording tape and the tape leader used in the tape transport of the present invention; and FIG. 9 is an elevational view, partly in section, of a modified actuator bar which may be employed in the invention.

DESCRIPTION OF THE PREFERRED EMBODIMENT

Figure 1:
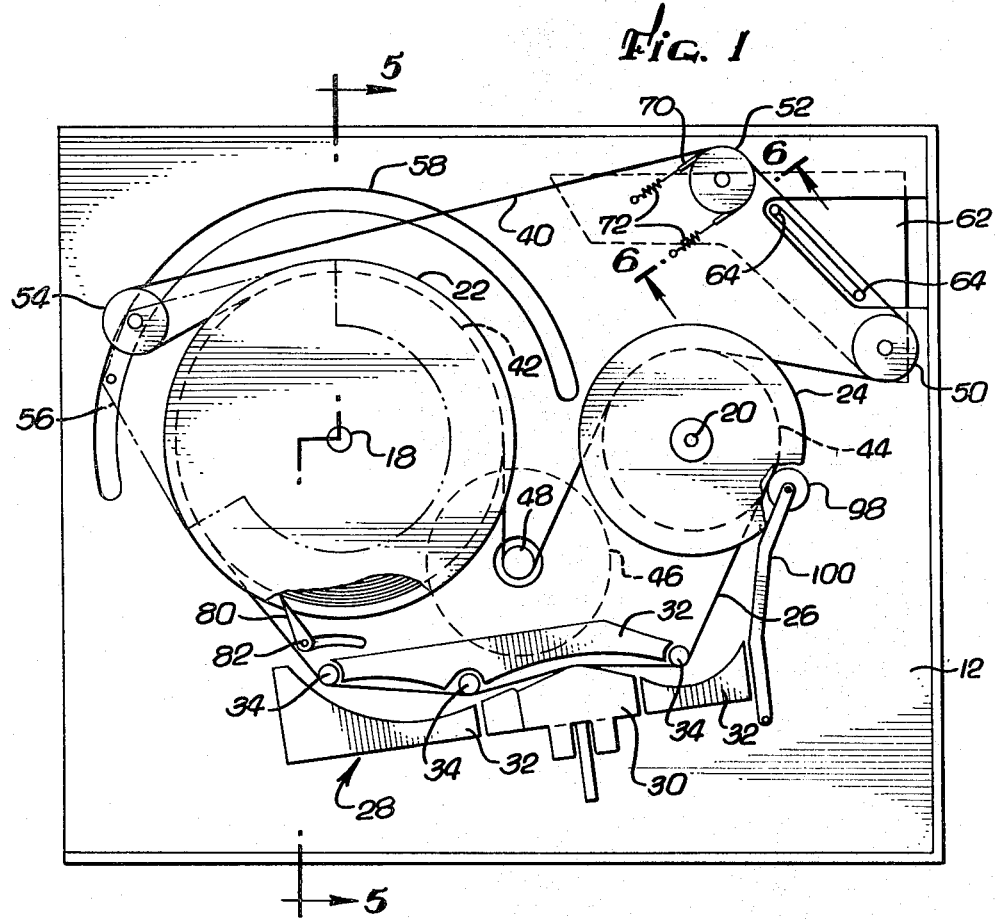
FIG. 1 is a simplified plan view of a belt-driven tape transport embodying the present invention.

As shown in the drawings for purposes of illustration, the present invention is principally concerned with an improved belt-driven tape transport. A well known type of tape transport employs a resilient drive belt passing over a drive pulley and guide rollers, and engaging wound packs of tape on a supply reel and a take-up reel. When the drive pulley is rotated at a constant speed, a constant linear tape speed is obtained as the tape passes from the supply reel to the take-up reel. Tape drives of this type have the principal disadvantage that, since the drive belt is engaged with the periphery of the supply tape pack, loading and unloading of the supply reel is difficult.

In accordance with the present invention, the drive belt is automatically disengaged from the supply reel tape pack, to facilitate loading and unloading of the supply reel. As best shown in the cross-sectional view of FIG. 5, the tape transport of the invention is contained in a housing, indicated by reference numeral 10, and is mounted on a support frame 12. The support frame 12 is carried in the housing 10 by means of chassis slides 14 and 16. Thus, the support frame 12 moves slidably with respect to the housing 10 in the manner of a drawer. As will shortly become apparent, the support frame 12 is moved out from the housing 10 for loading and unloading of tape.

As shown in FIG. 1, there are two spindles 18 and 20 mounted on the support frame 12, to support a tape supply reel 22 and take-up reel 24, respectively. A span of magnetic tape 26 extending from the supply reel 22 to the take-up reel 24 passes through a tape guide channel, indicated generally by reference numeral 28. The tape guide channel 28 is defined in part by a number of irregularly shaped tape leader guide elements 32 arranged in such a manner that, when a tape leader is taken from the supply reel 22, it will be guided past the tape recording head 30 and on towards the take-up reel 24. Contained within the tape guide channel 28 are a number of tape guide pins or rollers 34, which define the path of the tape after threading through the guide block 28.

The tape is driven from the supply reel 22 to the take-up reel 24 by a drive belt 40 engaging the wound pack of tape 42 on the drive reel 22 and the wound pack of tape 44 on the take-up reel 24. Also mounted on the support frame 12 is a drive motor 46, having a drive pulley 48 which projects through the support frame 12 to engage the drive belt 40. The axis of the drive motor 46 is located approximately midway between the spindles 18 and 20, but is displaced to one side of a line between these spindles, such that the drive belt 40 passes around approximately 180 degrees of the periphery of the drive pulley 48 and engages at least 90 degrees of the periphery of each tape pack. After passing around a portion of the take-up tape pack 44, the drive belt 40 engages two rollers 50 and 52 rotatably mounted on the support framed 12, and then passes around a movable roller 54 before engaging the supply tape pack 42.

Figure 3:
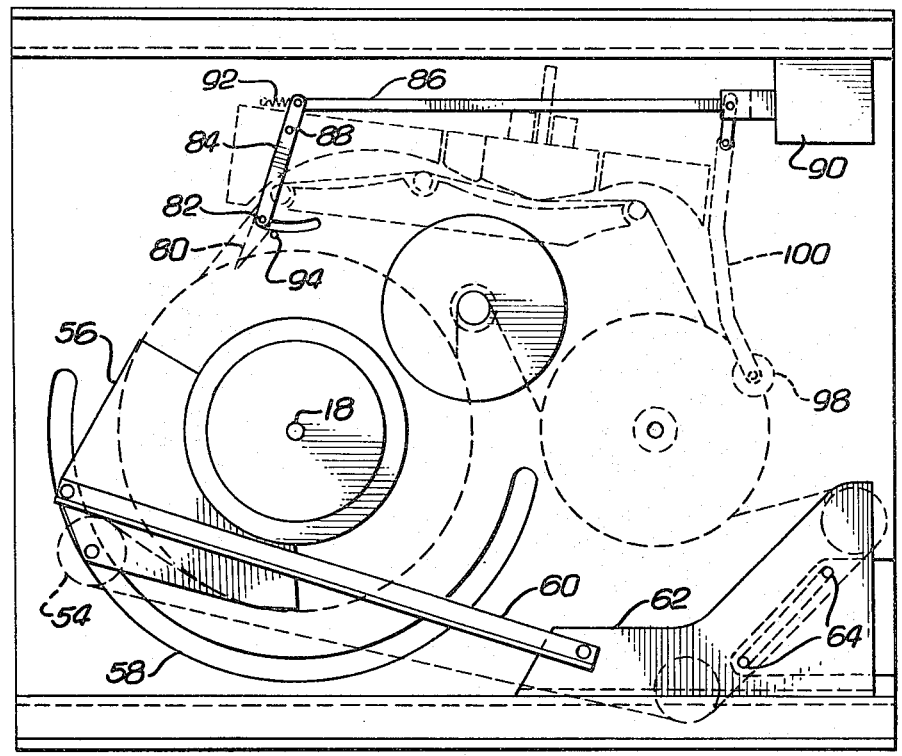
FIG. 3 is a bottom plan view of the tape transport of FIG. 1.

In accordance with an important aspect of the invention, the movable roller 54, in addition to being mounted for rotation on its own axis, is movable about a circular arc with respect to the spindle 18 on which the supply tape reel 22 is mounted. The movable roller 54 is rotatably mounted on a pivot plate 56 mounted beneath the support frame 12 for rotation about the same axis as the spineld 18. Thus, as the pivot plate 56 is rotated the axis of the movable roller 54 moves along an arcuate slot 58 in the support frame 12. As shown in the bottom plan view of FIG. 3, an actuating bar 60 connects the pivot plate 56 to a mounting bracket 62, which is rigidly connected to the housing 10. The actuating bar 60 is pivoted at each end and, when the support frame 12 is moved out of the housing 10, to the left as shown in the drawings, the actuating bar 60 rotates the pivot plate 56 counter-clockwise as viewed from beneath and clockwise as viewed from above in FIG. 1.

Figure 4:
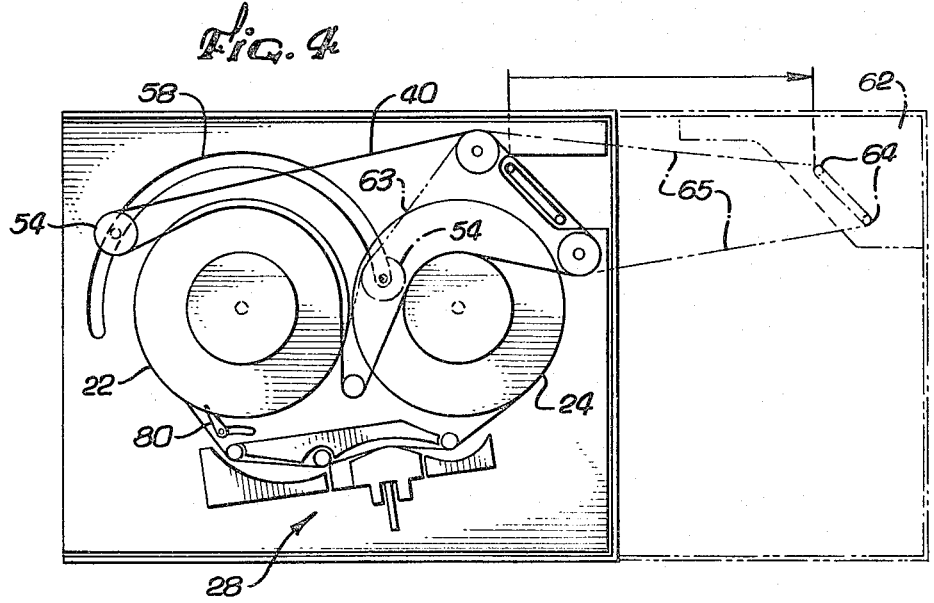
FIG. 4 is a plan view similar to FIG. 1, but drawn to a reduced scale and showing how the transport is moved for loading and unloading of tape.

It will be seen from FIG. 1 that this movement of the movable roller 54 disengages the drive belt 40 from the supply tape pack 42. A broken line 63 in FIG. 4 indicates the new position of the drive belt 40 when the movable roller 54 has been translated all the way to the end of the arcuate slot 58. In this position, the supply reel 22 may easily be removed and replaced without interference with the drive belt 40.

To keep the drive belt 40 under tension during the loading and unloading operation, the belt drive path length is increased by means of a pair of drive belt pick-off pins 64 secured to the housing bracket 62. When the tape transport is in normal operation, the pins 66 are disposed between the two rollers 50 and 52 on the support frame and do not engage the drive belt 40. As the support frame 12 is moved out from the housing 10, the pins 64 engage a short span of the drive belt between the two rollers 50 and 52, thereby retaining the portion of the belt in the housing, as indicated by the broken lines 65 in FIG. 4. This compensates for the shortening of drive belt path length caused by movement of the movable roller 54 on withdrawal of the suppport frame 12 from the housing 10.

During the loading operation, as well as when no supply reel is loaded, the belt 40 is stretched to various degrees, but typically is stretched 20–30% less than in the normal operating position with the supply reel engaged with the belt. If the overall stretch of the belt between its operating position and its unstretched position is less than 20–30%, a modification of the actuator bar 60 will prove advantageous, to prevent the belt from falling off during the operations described above. FIG. 9 shows the modified bar, referred to as 60', which has two telescoping portions 66 and 67 biased into an extended position by a compression spring 68. Relative movement is limited by a transverse pin 69 passing through the portions 66 and 67. In the normal operating position of the drive, the spring 68 is compressed. During loading operations, if belt tension is low expansion of the spring 68 will keep the belt under increased tension.

It is important to maintain an appropriate tape tension in the tape during normal recording or playback operation. The following tape tension formula has been derived:

$$F_{tape} = T_{50}/R_{50} + T_{52}/R_{52} + T_{54}/R_{54} + T_{22}/R_{42} - T_{24}/R_{44}$$

where:

$F_{tape}$ = the tape tension,
T = braking torque,
R = the radius of engagement of the drive belt, and the subscripts refer to the reference numerals of the pulleys and tape reels.

In accordance with this expression, the tape tension is given by taking the sum of the quotients obtained by dividing the braking torque by the effective radius for each of the pulleys 50, 52 and 54, and for the supply reel 22, and subtracting the quotient obtained by dividing the braking torque on the take-up reel 24 by the take-up pack radius.

Figure 2:
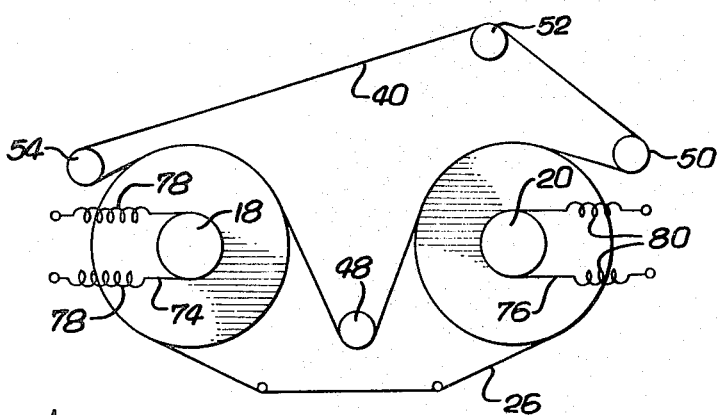
FIG. 2 is a simplified view of the tape transport of the invention illustrating an alternative braking arrangement for providing tape tension.

It is preferable to apply braking torque to only one roller or reel and to design the remaining bearings to be as frictionless as possible, as by the use of ball bearings. This allows for easier control and adjustment of the tape tension, since only a single adjustment needs to be made. As shown in FIGS. 1 and 6, for example, the pulley 52 is braked by means of a brake band 70 engaging approximately 180 degrees of a portion of the pulley 52, and a pair of adjustable springs 72 for applying a desired amount of braking torque. Alternatively, as shown in FIG. 2, the supply and take-up spindles 18 and 20, respectively, can be selectively braked by means of brake bands 74 and 76 and two pairs of springs 78 and 80.

Threading of a tape on the supply reel 22 is accomplished by conventional tape picking and threading techniques. A tape pick 80 is rotatably mounted on a shaft 82 at one end of a lever arm 84. The lever arm 84 is pivotally attached by its other end to an actuator rod 86, and pivoted at a point 88 between its ends. The actuator rod 88 is movable axially by a solenoid 90 and is biased by a tension spring 92. The pick 80 is torsionally spring-biased on its shaft 82 toward the tape pack, but is normally prevented from contacting the tape by a post 94 that it engages when the spring 92 is effective in moving the lever arm 84 counter-clockwise, as viewed in FIG. 3. When the solenoid 90 is actuated, the pick 80 is moved away from the post 94 and is biased against the tape pack. A relatively stiff leader 96 on the tape 26 is picked from the supply reel 22 and pushed through the tape guide channel 28. As the leader 96 emerges from the channel 28, it is directed toward the take-up reel 24, and is there engaged by a pinch roller 98 mounted at the end of another lever arm 100. Actuation of the solenoid 90 also rotates the lever arm 100 and moves the pinch roller 98 into engagement with the hub of the take-up reel 24. The leader 96 is retained by resilient grips 102 on the take-up reel 24, and the solenoid 90 is subsequently deactuated, to disengage the pinch roller 98 and the pick 80.

It will be appreciated from the foregoing that the present invention represents a significant advance in the field of belt-driven tape transports. In particular, the invention provides a tape transport with all the advantages of a belt-driven device, but with the added advantage of easy loading and unloading of tape. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A belt driven tape transport, comprising:
   a housing;
   a tape transport support frame mounted for sliding movement into and out of said housing;
   means for supporting a supply tape pack and a take-up tape pack on said tape transport support frame;
   a drive motor and drive pulley mounted on said tape transport support frame;
   an endless drive belt engageable with said drive pulley and with at least a ninety-degree peripheral portion of both tape packs; and
   means for automatically disengaging said drive belt from the supply tape pack when said tape transport support frame is moved out from said housing, thereby facilitating tape loading and unloading, said means for automatically disengaging said drive belt including means affixed to said housing, for engaging said drive belt and thereby effecting its disengagement from the tape supply pack when said tape transport support frame is moved out from said housing.

2. A belt driven tape transport, comprising:
   a housing;
   a tape transport support frame mounted for sliding movement into and out of said housing;
   means for supporting a supply tape reel and a take-up reel for rotation on said support frame, the reels carrying a supply tape pack and a take-up tape pack, respectively;
   a drive motor mounted on said support frame and having a drive pulley;
   an endless drive belt engageable with said drive pulley and the tape packs, to drive the tape at a desired speed past a transducer;
   a plurality of drive belt rollers positioned in such a manner as to ensure that said drive belt engages at least a ninety-degree peripheral portion of each tape pack;
   mechanical means for moving at least one of said drive belt rollers in an arcuate path about the supply tape reel, to disengage said drive belt from the supply tape pack and thereby facilitate tape loading and unloading; and
   means affixed to said housing, for engaging a portion of said drive belt as said support frame is withdrawn from said housing, thereby retaining a portion of said drive belt in said housing and ensuring disengagement of said belt from said supply tape pack.

3. A belt driven tape transport, comprising:
   a housing;
   a tape transport support frame mounted for sliding movement with respect to said housing;
   means for supporting a supply tape pack and a take-up tape pack on said tape transport frame;
   a drive motor and drive pulley mounted on said tape transport frame;
   an endless drive belt engageable with said drive pulley and with both tape packs; and
   means for automatically disengaging said drive belt from the supply tape pack when said tape transport frame is moved out from said housing, thereby facilitating tape loading and unloading;

wherein said means for automatically disengaging said drive belt includes a drive belt roller movable between a first position in which said drive belt is engaged with the supply tape pack and a second position in which said drive belt is not engaged with the supply tape pack, and mechanical means coupling said drive belt roller to said housing and to said support frame, wherein said drive belt roller is moved from the first position to the second position as said support frame is moved out from said housing, said mechanical means including a pivot plate pivotally connected to said support frame and having mounted thereon said drive belt roller, and an actuating rod connecting said pivot plate to said housing, whereby movement of said support frame with respect to said housing imparts rotation to said pivot plate and moves said drive belt roller.

4. A belt driven tape transport as set forth in claim 3, wherein said means for automatically disengaging said drive belt further includes:

means affixed to said housing, for engaging a span of said drive belt as said support frame is withdrawn from said housing, thereby retaining a portion of said drive belt in said housing and ensuring disengagement of said belt from the supply tape pack.

5. A belt driven tape transport, comprising:
a housing;
a tape transport support frame mounted for sliding movement into and out of said housing;
means for supporting a supply tape pack and a take-up tape pack on said tape transport support frame;
a drive motor and drive pulley mounted on said tape transport support frame;
an endless drive belt engageable with said drive pulley and with at least a ninety-degree peripheral portion of both tape packs; and
means for automatically disengaging said drive belt from the supply tape pack when said tape transport support frame is moved out from said housing, thereby facilitating tape loading and unloading;
wherein said means for automatically disengaging said drive belt includes
a drive belt roller movable in an arcuate path about the supply reel, between a first position in which said drive belt is fully engaged with the supply tape pack and a second position in which said drive belt is not engaged with the supply tape pack, and
mechanical means coupling said drive belt roller to said housing and to said support frame, wherein said drive belt roller is moved from the first position to the second position as said support frame is moved out from said housing.

6. A belt driven tape transport as set forth in claim 5, wherein said means for automatically disengaging said drive belt further includes:

means affixed to said housing, for engaging a span of said drive belt as said support frame is withdrawn from said housing, thereby retaining a portion of said drive belt in said housing and ensuring disengagement of said belt from the supply tape pack.

7. A belt driven tape transport, comprising:
a housing;
a tape transport support frame mounted for sliding movement with respect to said housing;
means for supporting a supply tape reel and a take-up reel for rotation on said support frame, the reels carrying a supply tape pack and a take-up tape pack, respectively;
a drive motor mounted on said support frame and having a drive pulley;
an endless drive belt engageable with said drive pulley and the tape packs, to drive the tape at a desired speed past a transducer;
a plurality of drive belt rollers, one of which is movable with respect to said support frame, said rollers ensuring that said drive belt engages a substantial peripheral portion of each tape pack;
a pivot plate mounted for limited rotational movement about the same axis of rotation as the supply tape reel, said movable roller being mounted on said pivot plate;
an actuating rod pivotally connected by one of its ends to said ivot plate and by the other of its ends to a portion of said housing, whereby withdrawal of said support frame from said housing results in rotation of said pivot plate and movement of said movable drive belt roller, to disengage said drive belt from the supply tape pack;
a pair of upstanding pins on said housing located inside the path of said drive belt in normal operation of the tape transport, and operative to retain a span of said belt within said housing upon withdrawal of said support frame, thereby maintaining said belt in tension on movement of said movable roller, and ensuring complete disengagement of said belt from the supply tape pack; and
adjustable braking means on one of said plurality of drive belt rollers, to obtain a desired tape tension.

8. A belt driven tape transport as set forth in claim 7, and further including:
means for automatically threading a tape leader from the supply reel to the take-up reel.

9. A belt driven tape transport as set forth in claim 8, wherein said means for automatically threading includes:
a tape guide through which the tape leader is pushed, said tape guide being defined in part by a magnetic tape transducer;
picking means, for picking the tape leader from the supply reel and directing it into said tape guide; and
pinch roller means for guiding the tape leader into engagement with the take-up reel.

10. A belt driven tape transport, comprising:
a housing;
a tape transport support frame mounted for sliding movement into and out of said housing;
means for supporting a supply tape reel and a take-up reel for rotation on said support frame, the reels carrying a supply tape pack and a take-up tape pack, respectively;
a drive motor mounted on said support frame and having a drive pulley;
an endless drive belt engageable with said drive pulley and the tape packs, to drive the tape at a desired speed past a transducer;
a plurality of drive belt rollers positioned in such a manner as to ensure that said drive belt engages at least a ninety-degree peripheral portion of each tape pack; and
mechanical means for moving at least one of said drive belt rollers in an arcuate path about the supply tape reel, the arcuate path having a center of curvature approximately the same as that of the supply reel, to disengage said drive belt from the supply tape pack and thereby facilitate tape loading and unloading.

11. A belt driven tape transport as set forth in claim 10, and further including adjustable braking means on one of said plurality of drive belt rollers, to ensure a desired tape tension.

12. A belt driven tape transport as set forth in claim 10, and further including adjustable braking means on the supply and take-up reels, to obtain a desired tape tension.

13. A belt driven tape transport as set forth in claim 10, and further including:
means for automatically threading a tape leader from the supply reel to the take-up reel.

14. A belt driven tape transport as set forth in claim 13, wherein said means for automatically threading includes:
a tape guide through which the tape leader can be pushed, said tape guide being defined in part by a magnetic tape transducer;
picking means, for picking the tape leader from the supply reel and directing it into said tape guide; and
pinch roller means for guiding the tape leader into engagement with the take-up reel.

15. A belt driven tape transport, comprising:
a housing;
a tape transport support frame mounted for sliding movement with respect to said housing;
means for supporting a supply tape reel and a take-up reel for rotation on said support frame, the reels carrying a supply tape pack and a take-up tape pack, respectively;
a drive motor mounted on said support frame and having a drive pulley;
an endless drive belt engageable with said drive pulley and the tape packs, to drive the tape at a desired spped past a transducer;
a plurality of drive belt rollers positioned in such a manner as to ensure that said drive belt engages a substantial peripheral portion of each tape pack; and
mechanical means for moving at least one of said drive belt rollers, to disengage said drive belt from the supply tape pack and thereby facilitate tape loading and unloading;
wherein said mechanical means includes a drive belt roller mounting plate mounted for movement with respect to said support frame, and a mechanical linkage coupling said mounting plate to said housing;
and wherein said roller mounting plate is moved automatically upon movement of said support frame with respect to said housing.

16. A belt driven tape transport as set forth in claim 15, and further including:
means affixed to said housing, for engaging a portion of said drive belt as said support frame is withdrawn from said housing, thereby retaining a portion of said drive belt in said housing and ensuring disengagement of said belt from said supply tape pack.

17. A belt driven tape transport as set forth in claim 15, and further including adjustable braking means on one of said plurality of drive belt rollers, to ensure a desired tape tension.

18. A belt driven tape transport as set forth in claim 15, and further including adjustable braking means on the supply and take-up reels, to obtain a desired tape tension.

19. A belt driven tape transport as set forth in claim 15, and further including:
means for automatically threading a tape leader from the supply reel to the take-up reel.

20. A belt driven tape transport as set forth in claim 19, wherein said means for automatically threading includes:
a tape guide through which the tape leader can be pushed, said tape guide being defined in part by a magnetic transducer;
picking means, for picking the tape leader from the supply reel and directing it into said tape guide; and
pinch roller means for guiding the tape leader into engagement with the take-up reel.

21. A belt driven tape transport as set forth in claim 15, wherein:
said roller mounting plate is pivotally mounted on said support frame for rotation about the same axis as the supply reel; and
said mechanical linkage includes a rod pivotally connected to said roller mounting plate and to a portion of said housing.

22. A belt driven tape transport as set forth in claim 21, and further including:
means affixed to said housing, for engaging a portion of said drive belt as said support frame is withdrawn from said housing, thereby retaining a portion of said drive belt in said housing and ensuring disengagement of said belt from said supply tape pack.

23. A belt driven tape transport as set forth in claim 21, and further including adjustable braking means on one of said plurality of drive belt rollers, to ensure a desired tape tension.

24. A belt driven tape transport as set forth in claim 21, and further including adjustable braking means on the supply and take-up reels, to obtain a desired tape tension.

25. A belt driven tape transport as set forth in claim 21, and further including:
means for automatically threading a tape leader from the supply reel to the take-up reel.

26. A belt driven tape transport as set forth in claim 25, wherein said means for automatically threading includes:
a tape guide through which the tape leader can be pushed, said tape guide being defined in part by a magnetic transducer;
picking means, for picking the tape leader from the supply reel and directing it into said tape guide; and
pinch roller means for guiding the tape leader into engagement with the take-up reel.

* * * * *